(12) United States Patent
Liu

(10) Patent No.: US 6,654,990 B2
(45) Date of Patent: Dec. 2, 2003

(54) QUICK-RELEASE HOOK

(75) Inventor: Ruey-Shan Liu, Kaohsiung (TW)

(73) Assignee: Chung-Shan Institute of Science, Taoyuan (TW)

( * ) Notice: Subject to any disclaimer, the term of this patent is extended or adjusted under 35 U.S.C. 154(b) by 0 days.

(21) Appl. No.: 10/063,629

(22) Filed: May 6, 2002

(65) Prior Publication Data

US 2002/0162201 A1 Nov. 7, 2002

(30) Foreign Application Priority Data

May 4, 2001 (TW) .................................. 90207251 U

(51) Int. Cl.[7] ........................... E05C 3/06; B66C 1/34; F16B 45/06
(52) U.S. Cl. .............. 24/598.5; 294/82.33; 294/82.34; 294/82.24
(58) Field of Search .......................... 24/598.5, 370, 24/598.4; 294/82.24, 82.33, 82.34

(56) References Cited

U.S. PATENT DOCUMENTS

| | | | |
|---|---|---|---|
| 1,684,322 A | * 9/1928 | Itjen | 24/598.4 |
| 3,013,517 A | * 12/1961 | Isham | 24/598.5 X |
| 3,952,382 A | * 4/1976 | Vaage | 24/598.4 |
| 4,613,180 A | * 9/1986 | Pope | 294/82.34 |
| 4,702,447 A | * 10/1987 | Westwood, III | 248/231.51 |
| 5,430,914 A | * 7/1995 | Patterson et al. | 24/598.5 |
| 5,606,782 A | * 3/1997 | Patterson et al. | 24/598.5 |
| 5,867,877 A | * 2/1999 | Patterson et al. | 24/598.5 |

* cited by examiner

*Primary Examiner*—Robert J. Sandy
(74) *Attorney, Agent, or Firm*—Jiang Chyun IP Office

(57) ABSTRACT

A quick-release hook comprising a latching hook locker, a spring, a pair of latching hooks, a pull lever and a main body. One end of the latching hook locker is shaped into a cylinder and the other end is shaped into a frustum. The latching hook locker also has a groove slot on the side of the cylinder section close to the frustum. The spring is fastened to the cylindrical end of the latching hook locker. The two latching hooks each has a U-shaped profile and is in contact with the frustum of the latching hook locker. One end of the pull lever has a protruding section for inserting into the groove slot of the latching hook locker. The main body encloses the latching hook locker, the spring, the pull lever and the two latching hooks but exposes a portion of the two latching hooks and a portion of the pull lever. The pull lever has a protruding section that links up with the main body. The other end of the pull lever remains outside the main body and is free to rotate in an arc. One end of each latching hook is enclosed and attached to the main body. The other end of the latching hook remains outside the main body and is free to rotate in an arc.

11 Claims, 5 Drawing Sheets

QUICK-RELEASE HOOK

CROSS REFERENCE TO RELATED APPLICATIONS

This application claims the priority benefit of Taiwan application serial no. 90207251, filed May 04, 2001.

BACKGROUND OF INVENTION

1. Field of Invention

The present invention relates to a quick-release hook. More particularly, the present invention relates to an easy to operate quick-release hook.

2. Description of Related Art

In moving, transporting or stationing a heavy object, a releasable hook is often employed so that the heavy object is linked to a carrier for easy maneuver. Currently, most releasable hook has a main body, a releasing rod and an L-shaped latching hook. To latch up the hook, one hand has to grasp the main body while the other hand moves the L-shaped latching hook through the heavy object and jerks up the hook to snap into the main body. Similarly, to release the hook, one hand has to grasp the main body while the other hand triggers the releasing rod so that the L-shaped latching hook is released from the main body. Such latching and releasing method is clumsy to operate.

FIG. 1 is a schematic diagram of a conventional releasable hook. As shown in FIG. 1, a conventional releasable hook has a main body 40, an L-shaped latching hook 42 and a releasing rod 48. The main body 40 has a fastening hole 46. To operate the latching mechanism of this releasable hook, one hand has to grasp the main body 40 while the other hand grips the L-shaped latching hook 42 to hook up a heavy object. Thereafter, the L-shaped latching hook 42 jerks up quickly so that the L-shaped latching hook 42 snaps into the main body 40. To release the hook, one hand has to grasp the main body 40 while the other hand operates the releasing rod 48. Ultimately, the L-shaped latching hook 42 moves away from the main body 40 releasing the heavy object.

Major drawbacks for this type of releasable hook includes:

1. The operator has to use both hands to hook up with a heavy object or to release the hook from a heavy object. One hand is required to grip the main body while the other hand is required to snap the L-shaped latching hook onto the main body.
2. When the L-shaped latching hook is hooked onto a heavy object, a quick upward jerking motion is required to lock up the hook with the main body. Hence, the operator needs to provide extra force at this point.

SUMMARY OF INVENTION

Accordingly, one object of the present invention is to provide an easy to use and strength-saving quick-release hook.

To achieve these and other advantages and in accordance with the purpose of the invention, as embodied and broadly described herein, the invention provides an easy to operate quick release hook. The quick-release hook comprises of a latching hook locker, a spring, a pair of latching hooks, a pull lever and a main body. One end of the latching hook locker is shaped into a cylinder and the other end is shaped into a truncated cone or frustum. The latching hook locker also has a groove slot on the side of the cylinder section close to the frustum. The spring is attached to the cylindrical end of the latching hook locker. The two latching hooks each has a U-shaped profile and is in contact with the frustum of the latching hook locker. One end of the pull lever has a protruding section for inserting into the groove slot of the latching hook locker. The main body encloses the latching hook locker, the spring, the pull lever and the two latching hooks but exposes a portion of the two latching hooks and a portion of the pull lever. The main body has a fastening hole for fixing the quick-release hook. A protruding section of the pull lever is enclosed inside the main body and attached to the main body using a dowel pin. The other end of the pull lever is a free end capable of rotating in an arc. The free end of the pull lever has a hole. One end of each latching hook is enclosed inside the main body and attached to the main body using a dowel pin. The other end of the latching hook is a free end capable of rotating in an arc. The free end of each latching hook has a protruding section that overlaps to form a tight junction when the two latching hooks are pressed together.

The quick-release hook according to this invention may include a plurality of steel balls. Furthermore, the cylindrical side surface of the latching hook locker may include a plurality of recess cavities. The steel balls are placed inside the recess cavities in contact with the main body so that the latching hook locker is able to slide smoothly inside the main body.

The quick-release hook of this invention further includes a safety pin. In addition, the main body and the free end of the pull lever each has a safety pin hole. When the protruding section of each latching hook overlaps, the two safety pin holes are on top of each other. The safety pin may be inserted through the overlapping safety pin holes so that the pull lever is stationed relative to the main body. Hence, the free end of the pull lever is no longer free to rotate.

This invention utilizes the contact between the frustum of the latching hook locker and the two latching hooks, the compressive force provided by the spring and the contact of the steel balls inside the latching hook locker with the main body to provide a quick-release hook that can be operated single-handedly. In fact, only a thumb and a forefinger are required to tighten the free end of the two latching hooks together. This is a big improvement to the dual-hand operated conventional latching hook.

The specially designed contact between the frustum of the latching hook locker and the two latching hooks as well as the contact between the steels balls within the latching hook locker and the main body according to this invention facilitates the meshing of the free ends of the two latching hooks together to form a latching ring. Unlike a conventional latching hook design that demands a large upward jerking force to lock up the hook, only a force large enough to overcome the compressive force of the spring is required.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
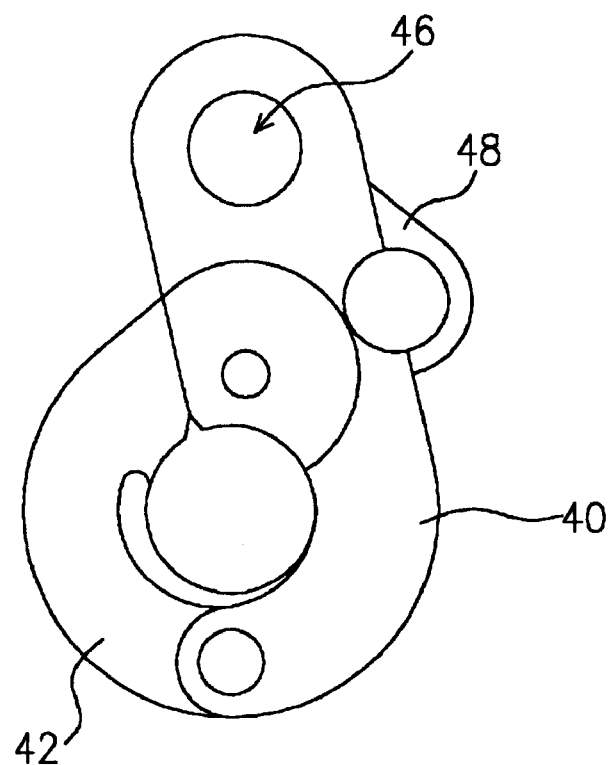
FIG. 1 is a schematic diagram of a conventional releasable hook.

Reference will now be made in detail to the present preferred embodiments of the invention, examples of which are illustrated in the accompanying drawings. Wherever possible, the same reference numbers are used in the drawings and the description to refer to the same or like parts.

Figure 2:
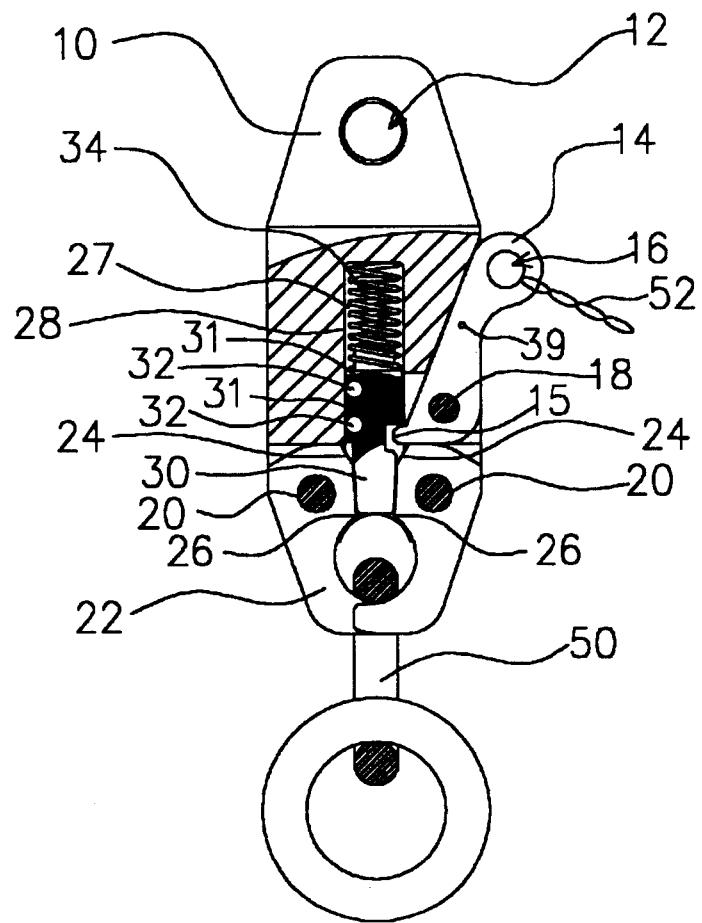
FIG. 2 is a side view of a quick-release hook according to one preferred embodiment of this invention.
Figure 3:
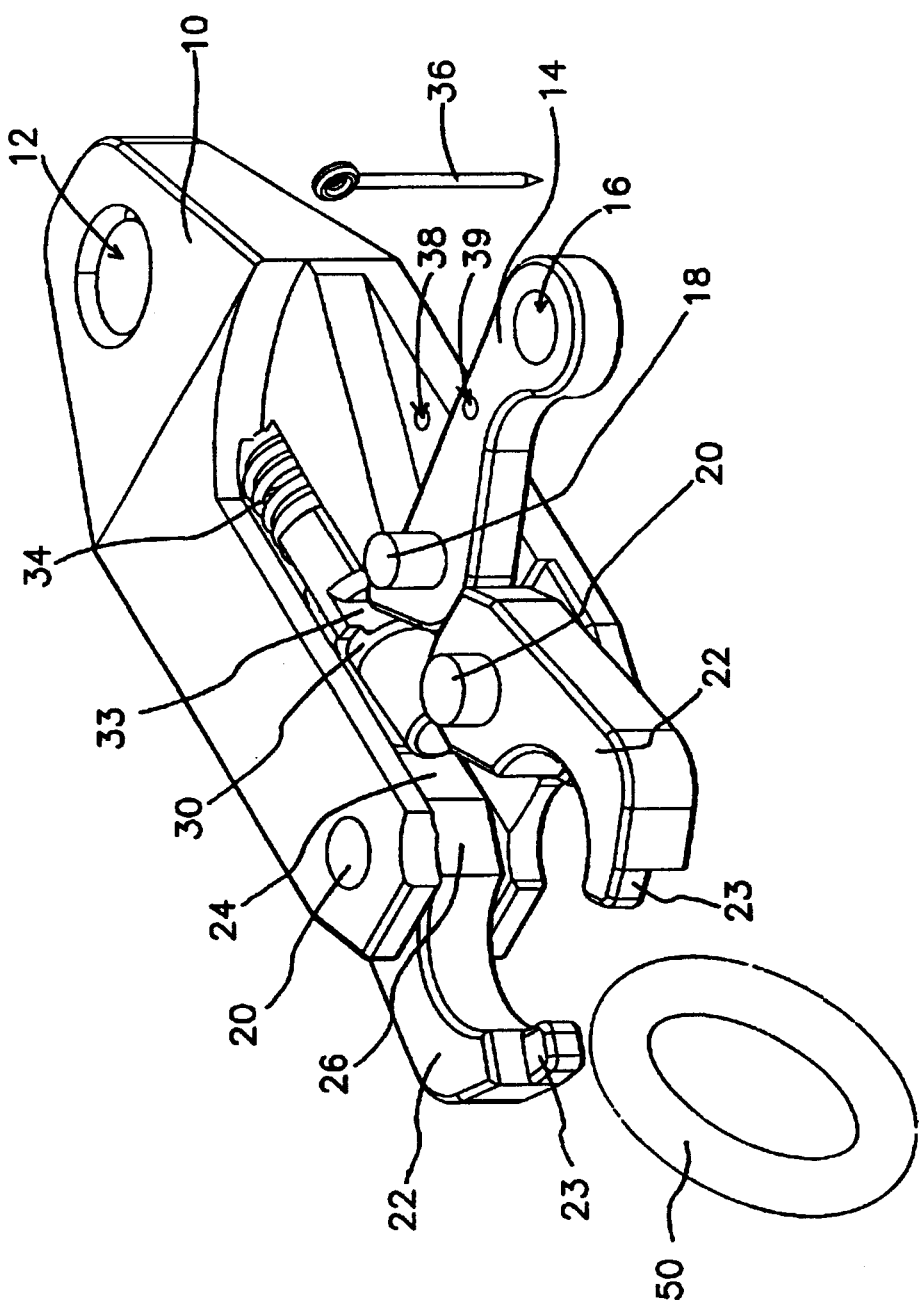
FIG. 3 is a perspective view of the quick-release hook according to this invention.

FIG. 2 is a side view of a quick-release hook according to one preferred embodiment of this invention. FIG. 3 is a perspective view of the quick-release hook according to this invention. The quick-release hook mainly comprises of a main body 19m a spring 34, a latching hook locker 30, a pair of latching hooks 22 and a pull lever 14. One end of the latching hook locker 30 is shaped into a cylinder while the other end is shaped into a frustum. The latching hook locker also has a groove slot 33 on the side of cylinder close to the frustum. The cylindrical side surface of the latching hook locker 30 also has a plurality of recess cavities for placing a steel ball 32 in each. The spring 34 is fastened on the cylindrical end of the latching hook locker 30. Each latching hook 22 has an approximately U-shaped profile in contact with the frustum of the latching hook locker 30. One end of the pull lever 14 has a protruding section 15 for inserting into the groove slot 33 of the latching hook locker 30. The main body 10 encloses the latching hook locker 30, the spring 34, the pull lever 14 and the two latching hook 22 but exposes a portion of the two latching hook 22, a portion of the pull lever 14. The main body 10 also has a fastening hole 12 for fixing the quick-release hook. The plurality of steel balls 32 inside the latching hook locker 30 is in contact with the main body 10 so that the latching hook locker 30 may slide smoothly inside the main body 10. The protruding section 15 of the pull lever 14 and the main body 10 are connected together through a dowel pin 18. The other end of the pull lever 14 is a free end capable of rotating in an arc of a circle. The pull lever 14 also has a hole 16 for tying a hand-pull rope 52 around. One end of each latching hook 22 is connected to the main body 10 through a dowel pin 20. The other end of each latching hook 22 is a free end capable of rotating in an arc of a circle. The free end of each latching hook 22 has a protruding section 23. When the two latching hooks 22 mesh together, the protruding sections 23 of the latching hooks 22 overlap with each other to form a tight join. The other end of the latching hook 22 having connection with the main body 10 has contact surfaces 24 and 26 for contacting with the frustum of the latching hook locker 30. In addition, the main body 10 has a safety pin hole 38 and the pull lever 14 have a safety pin hole 39. A safety dowel pin 36 may be inserted into the safety pin holes 38 and 39.

Figures 4, 5:
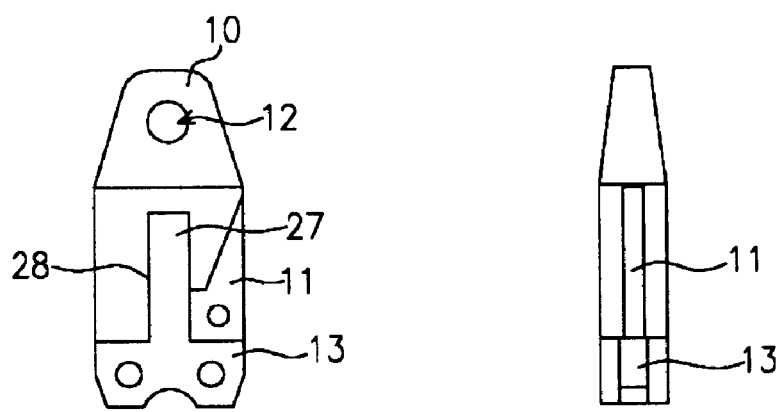
FIG. 4 is a side view of the main body of the quick-release hook according to this invention.
FIG. 5 is a side view of the latching hook locker of the quick-release hook according to this invention.

Since the latching hook locker, the spring, the pull lever and the two latching hooks are all enclosed inside the main body, the main body is further explained with reference to FIGS. 4 and 5. FIG. 4 is a side view of the main body of the quick-release hook according to this invention. FIG. 5 is a side view of the latching hook locker of the quick-release hook according to this invention. The central portion of the main body 10 has a concave chamber 27 for placing the spring 34 and the latching hook locker 30. The concave chamber 27 has sidewalls 28. The interior of the main body 10 also has a side groove 11 adjacent to and link up with the concave chamber 27 for placing the end of the pull lever 14 having the protruding section 15. The interior of the main body 10 further includes a lower groove 13 adjacent to and link up with the lower section of the concave chamber 27 for placing one end of the two latching hooks 22. The latching hook locker 30 may slide in the space between the concave chamber 27 and the lower groove 13 and the plurality of steel balls 32 inside the latching hook locker 30 are in contact with concave chamber 28.

Figure 6:
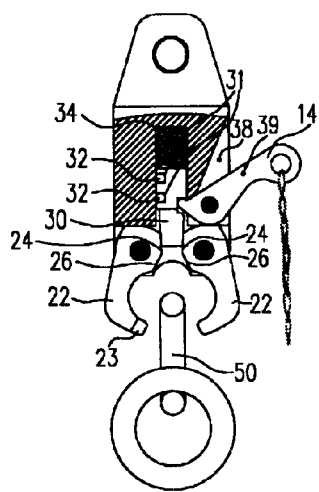
FIGS. 6 to 8 are a series of side views showing the sequence of steps for operating the quick-release hook according to one preferred embodiment of this invention.
Figure 7:
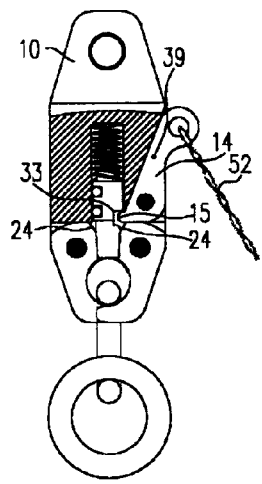
Figure 8:
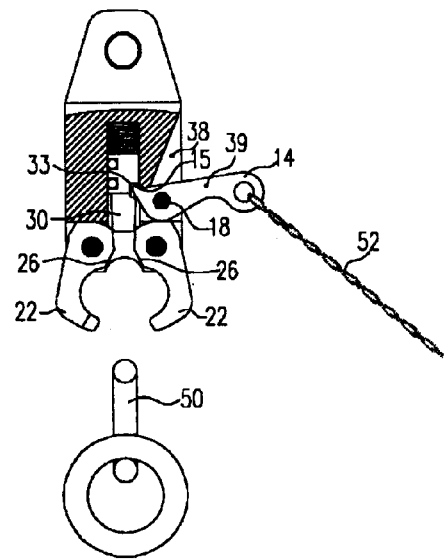

FIGS. 6, 7 and 8 are a series of side views showing the sequence of steps for operating the quick-release hook according to one preferred embodiment of this invention. FIG. 6 shows the latching of the quick-release hook. First, a loading hoop 50 is latched to a heavy object. Next, using the thumb and forefinger of a hand, the two latching hooks 22 are pressed together so that the two latching hooks 22 mesh together and lock up the loading hoop 50. When the free ends of the two latching hooks 22 are pushed towards the center, the contact surface 24 of the two latching hooks 22 rotates about the dowel pin 20. Thus, equal torque that compresses the spring 34 is generated and the frustum end of the latching hook locker 30 is clamped. The torque is converted into a linear motion on the latching hook locker 30 so that the latching hook locker 30 slides towards and compresses the spring 34. The steel balls 32 inside the latching hook locker 30 contact the sidewalls 28 of the concave chamber 27 so that friction between the latching hook locker 30 and the sidewalls 28 of the main body 10 is minimized. Hence, the latching hook locker 30 slides smoothly inside the main body 10.

FIG. 7 is a diagram showing the quick-release hook is fully latched. When the protruding section 23 of the latching hooks 22 overlaps, the contact surface 26 of the latching hooks 22 are approximately parallel to each other. With this configuration, forces supporting the latching hook locker 30 disappear. The spring 34 exerts a force on the latching hook locker 30 in the direction of the two latching hooks 22 and hence jams out any sideward movement of the latching hooks 22. The frustum end of the latching hook locker 30 is now positioned between the two latching hooks 22 in contact with their respective contact surfaces 26. In the meantime, the sliding motion of the latching hook locker 30 also brings down the groove slot 33 so that the protruding section 15 of the pull lever 14 also moves down. The free end of the pull lever 14 moves towards the main body 10 according to a lever action whose pivot is the down pin 18. When the two latching hooks 22 are pressed tightly together, the safety hole 38 on the main body 10 and the safety hole 39 on the pull lever 14 overlaps. After inserting a safety pin 36 into the safety holes 38 and 39, the pull lever 14 is fixed relative to the main body 10. At this stage, the latching operation for the quick-release hook is complete.

As shown in FIG. 7, the free end of the latching hooks 22 is prevented from disengagement even without inserting the safety pin 36 through the safety holes 38 and 39. This is because the spring 24 always provides a force that pushes against the latching hook locker 30 and jams the latching hooks 22 solid against any arc rotation.

To release the hook as shown in FIG. 8, the safety pin 36 is pulled out from the safety holes 38 and 39. Next, the pull lever 14 is pulled away from the main body 10 single-handedly by pulling a pull rope 52 stringed to one end of the pull lever 14. The pull lever 14 rotates as a lever about the dowel pin 18 so that the protruding section 15 of the pull lever 14 produces a torque to lift the protruding section 15. The protruding section 15 drags the groove slot 33 of the latching hook locker 30 up so that the latching hook locker 30 detaches from the two latching hooks 22. When the frustum end of the latching hook locker 30 moves away from the two latching hook 22, the free end of each latching hook 22 may now rotate. Due to the weight of the latching hooks 22 and the downward pull of the heavy object, the latching hooks 22 may separate from each other to release the heavy object.

In summary, this invention utilizes the structural design of latching hooks and a latching hook locker in association with steel balls, a spring and a pull lever to facilitate locking and releasing of the latching hooks. Major advantages of this invention includes:

(1) The two latching hooks can be pulled together by pressing the free end of the hooks using only the thumb and forefinger of a single hand. Utilizing the dowel pins of the latching hooks as a fulcrum, the two latching hooks may grip the frustum end of the latching hook locker and push the latching hook locker upward to compress the spring. When the protruding section of each latching hook meshes tightly with each other, the latching hook locker loses an upward support. The spring pushes the latching hook locker down towards the bottom section of the main body to lock up the latching hooks. Unlike a conventional releasable hook design that demands both hands to operate, only a single hand is required to operating the quick-release hook.

(2) The releasing mechanism of the quick-release hook can be activated by pulling the pull lever with only a single hand. Using the principle of lever action, a torque on the pull lever is converted to a linear motion lifting up the latching hook locker through a groove slot. When the frustum end of the latching hook locker is detached from the two latching hooks, the hooks are freed and the lift object is immediately released. Hence, only a single hand is required to release the object.

(3) Unlike a conventional releasable hook design that requires a large upward snapping force to lock up the hooks, the latching hooks according to this invention can be locked together using the thumb and forefinger of a single hand only.

(4) This invention uses steel balls to contact the main body and spring to provide supplementary force. Hence, the latching hook locker is able to slide smoothly inside the main body from both the release or locked positions.

(5) The quick-release hook has double safety measures in the locked position. A spring force is used to push against the latching hook locker and jam any movement at the free end of the latching hooks in the locked position. In addition, a safety pin may also be used to fix the position of the pull lever in the locked position.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A quick-release hook, comprising:

a latching hook locker having one end shaped into a cylinder and the other end shaped into a frustum, wherein the latching hook locker also has a groove slot on one side of the cylinder end close to the frustum;

a spring fastened to the cylinder end of the latching hook locker;

a pair of latching hooks each having a U-shaped profile and having contact with the frustum of the latching hook locker;

a pull lever having a protruding section for inserting into the groove slot;

a main body enclosing the latching hook locker, the spring, the pull lever and the latching hooks but exposing a portion of the two latching hooks and a portion of the pull lever, wherein the pull lever is linked to and enclosed by the main body near the protruding section while the other end of the pull lever is a free end capable of rotating in an arc of a circle, similarly, one end of each latching hook is linked to and enclosed by the main body while the other end is a free end capable of rotating in an arc of a circle, and the latching hook locker presses against the two latching hooks through the force exerted by the spring.

2. The quick-release hook of claim 1, wherein the quick-release hook further includes a plurality of steel balls embedded inside a plurality of recess cavities on the cylindrical side surface of the latching hook locker so that the latching hook locker is able to slide smoothly inside the main body.

3. The quick-release hook of claim 1, the pull lever has a hole.

4. The quick-release hook of claim 1, the quick-release hook further includes a plurality of dowel pins for linking up the pull lever and the two latching hooks to the main body.

5. The quick-release hook of claim 1, wherein the free end of each latching hook has a protruding section.

6. The quick-release hook of claim 1, wherein the main body has a safety pin hole and the free end of the pull lever has another safety pin hole.

7. The quick-release hook of claim 6, wherein the safety pin holes overlap when the protruding section of the two latching hooks overlaps.

8. The quick-release hook of claim 7, wherein the hook assembly further includes a safety pin passing through the overlapping safety pin holes for fixing the pull lever relative to the main body so that the pull lever is no longer free to rotate.

9. The quick-release hook of claim 1, wherein pressing the free end of the two latching hooks together compresses the spring and hence pushes the latching hook locker in the latching hook direction so that eventually the free end of the latching hooks is fixed, and in the meantime, the groove slot pushed down driving the protruding section of the pull lever along so that the free end of the pull lever rotates towards the main body.

10. The quick-release hook of claim 9, wherein the quick-release hook further includes a safety pin and the free end of the main body and the pull lever each has a safety hole such that the two safety holes overlaps when the two latching hooks are pressed tightly together and by passing the safety pin through the safety pin holes, the pull lever is fixed relative to the main body.

11. The quick-release hook of claim 10, wherein the free end of the pull lever may be pulled away from the main body after pulling the safety pin out from the safety pin holes so that the protruding section of the pull lever moves up dragging the groove slot along, pulling the latching hook locker away from the two latching hooks and compressing the spring, ultimately, the two latching hooks are free to rotate again.

* * * * *